US012586081B2

(12) United States Patent
Singh et al.

(10) Patent No.: US 12,586,081 B2
(45) Date of Patent: Mar. 24, 2026

(54) SYSTEMS AND METHODS FOR GENERATING PERSONALIZED CONTENT USING A LANGUAGE MODEL AND REINFORCEMENT TECHNIQUES

(71) Applicant: Verizon Patent and Licensing Inc., Basking Ridge, NJ (US)

(72) Inventors: Dheeraj Singh, Bareilly (IN); Durgesh Kumar, Bangalore (IN); Miruna Jayakrishnasamy, Vellore (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 177 days.

(21) Appl. No.: 18/542,925

(22) Filed: Dec. 18, 2023

(65) Prior Publication Data

US 2025/0200586 A1 Jun. 19, 2025

(51) Int. Cl.

| | |
|---|---|
| ***G06F 17/00*** | (2019.01) |
| ***G06F 40/166*** | (2020.01) |
| ***G06F 40/197*** | (2020.01) |
| ***G06F 40/279*** | (2020.01) |
| ***G06Q 30/016*** | (2023.01) |

(52) U.S. Cl.

CPC ......... *G06Q 30/016* (2013.01); *G06F 40/166* (2020.01); *G06F 40/197* (2020.01); *G06F 40/279* (2020.01)

(58) Field of Classification Search

CPC ... G06Q 30/016; G06F 40/166; G06F 40/197; G06F 40/279; G06F 40/30

See application file for complete search history.

(56) References Cited

U.S. PATENT DOCUMENTS

| | | | | |
|---|---|---|---|---|
| 8,798,989 | B2 * | 8/2014 | DelRocco | G06F 40/30 704/10 |
| 11,256,484 | B2 * | 2/2022 | Nikumb | G06F 8/38 |
| 11,715,042 | B1 * | 8/2023 | Liu | G06N 3/006 705/26.1 |
| 12,033,162 | B2 * | 7/2024 | Chopra | G06F 40/279 |
| 12,380,287 | B2 * | 8/2025 | Gardner | G06F 16/345 |
| 2018/0365325 | A1 * | 12/2018 | Gireesha | G06F 16/38 |
| 2021/0056270 | A1 * | 2/2021 | Farhan | G06F 16/3329 |

(Continued)

FOREIGN PATENT DOCUMENTS

| | | | | |
|---|---|---|---|---|
| CN | 106796581 A | * | 5/2017 | G06F 40/106 |
| WO | WO-2022216926 A1 | * | 10/2022 | G06F 40/35 |
| WO | WO-2024086216 A1 | * | 4/2024 | G06F 40/205 |

*Primary Examiner* — Laurie A Ries

(57) ABSTRACT

A device may receive user activity data identifying activities of a user, and content data identifying text transcripts associated with the user. The device may generate a first custom embedding associated with the user based on the user activity data, and may process the first custom embedding, with a machine learning model, to generate an intent of the user and a next action for the user based on the intent. The device may process the content data to generate a second custom embedding for the user and an end user vector based on the second custom embedding, and may generate a document vector for the user based on the next action for the user. The device may process the document vector and the end user vector, with a language model, to generate a document for the user, and may perform one or more actions based on the document.

20 Claims, 12 Drawing Sheets

(56) References Cited

U.S. PATENT DOCUMENTS

| | | | | |
|---|---|---|---|---|
| 2022/0088474 | A1* | 3/2022 | Dicken | A63F 13/79 |
| 2022/0172220 | A1* | 6/2022 | Ladkat | G06Q 10/10 |
| 2022/0246052 | A1* | 8/2022 | Smith Lewis | G09B 7/07 |
| 2022/0374605 | A1* | 11/2022 | Sethi | G06F 1/3209 |
| 2023/0135179 | A1* | 5/2023 | Mielke | G06N 5/022<br>704/232 |
| 2023/0244968 | A1* | 8/2023 | Gurin | G06N 3/0475<br>706/11 |
| 2023/0418793 | A1* | 12/2023 | Urdiales | G06F 16/215 |
| 2024/0104305 | A1* | 3/2024 | Glesinger | G06V 10/421 |
| 2024/0126997 | A1* | 4/2024 | Bent, III | G06Q 30/0242 |
| 2024/0296293 | A1* | 9/2024 | Tsun | H04L 51/02 |
| 2025/0004574 | A1* | 1/2025 | Chaturvedi | G06F 3/0236 |
| 2025/0005288 | A1* | 1/2025 | Amatriain-Rubio | G06F 40/216 |
| 2025/0061893 | A1* | 2/2025 | Grillo | G06F 3/0481 |
| 2025/0103325 | A1* | 3/2025 | Fu | G06F 8/33 |
| 2025/0354555 | A1* | 11/2025 | Tooley | F04C 18/126 |

* cited by examiner

130
Generate a first custom embedding associated with the user based on the user activity data

135
Process the content data, with a clustering model, to remove duplicate content from the content data First custom embedding Historical call/ chat intents Events/ Transactions Site Catalysts Search Remarks Support Tickets User activity data

120
Receive user activity data identifying activities of a user

125
Receive content data identifying text transcripts associated with the user Generation system
115

User

User device
105

Data structure
110

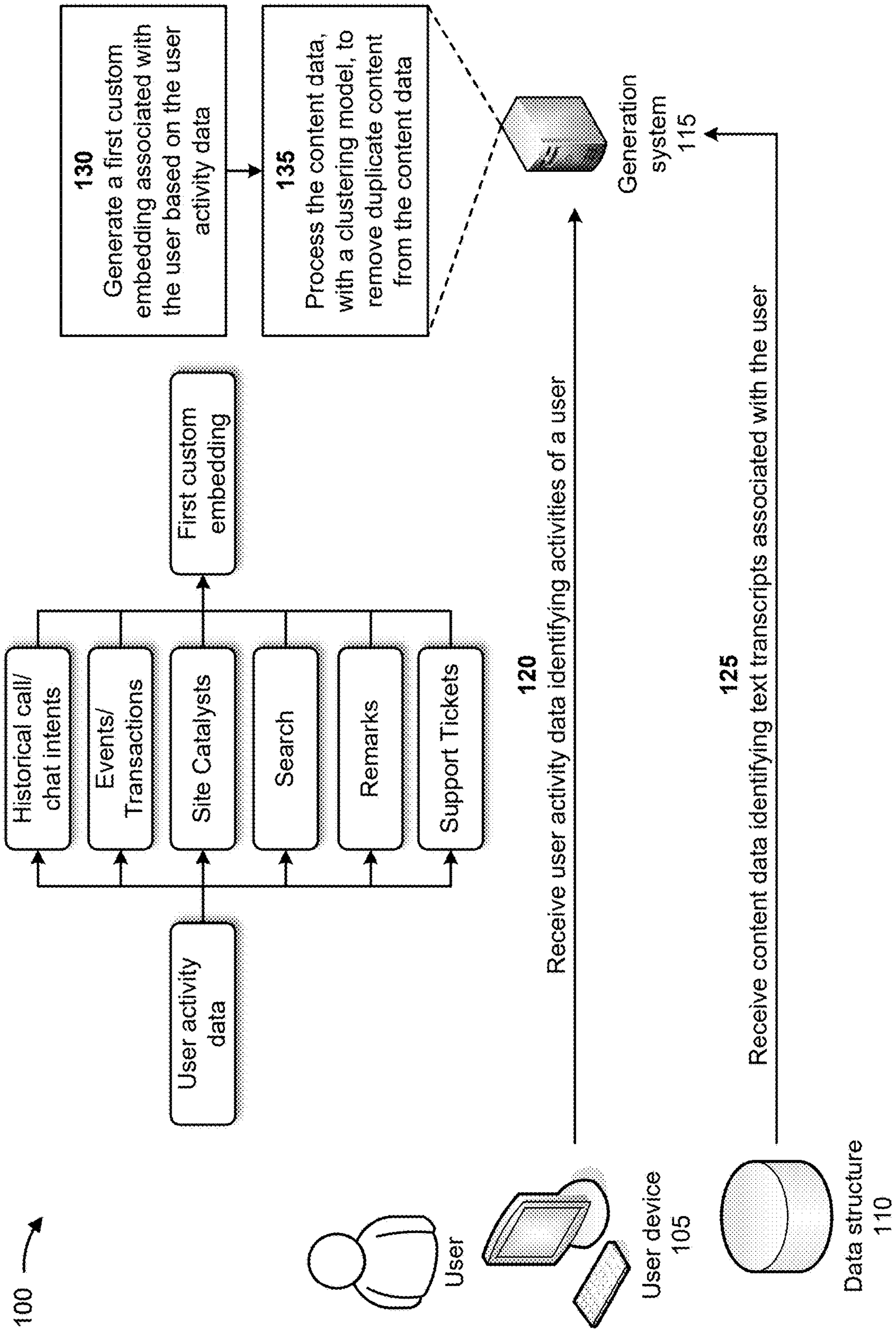

155
Process the document vector and the end user vector, with a language model, to generate a document for the user Document Language model Generation system 115

End user vector

Document vector

100

100

175

Process the document, with the language model, to generate a modified document for the user based on the user requiring assistance with the document Modified document Language model Generation system 115

Required assistance

Document

100

Provide the document or the modified document for display to the user

Provide the modified document for review by a content moderator

Determine whether the user required assistance with the modified document

Receive a request from the user based on the document or the modified document

Perform an action requested by the user based on the document or the modified document Retrain one or more of the models based on the document or the modified document

180
Perform one or more actions based on the document or the modified document Generation system 115

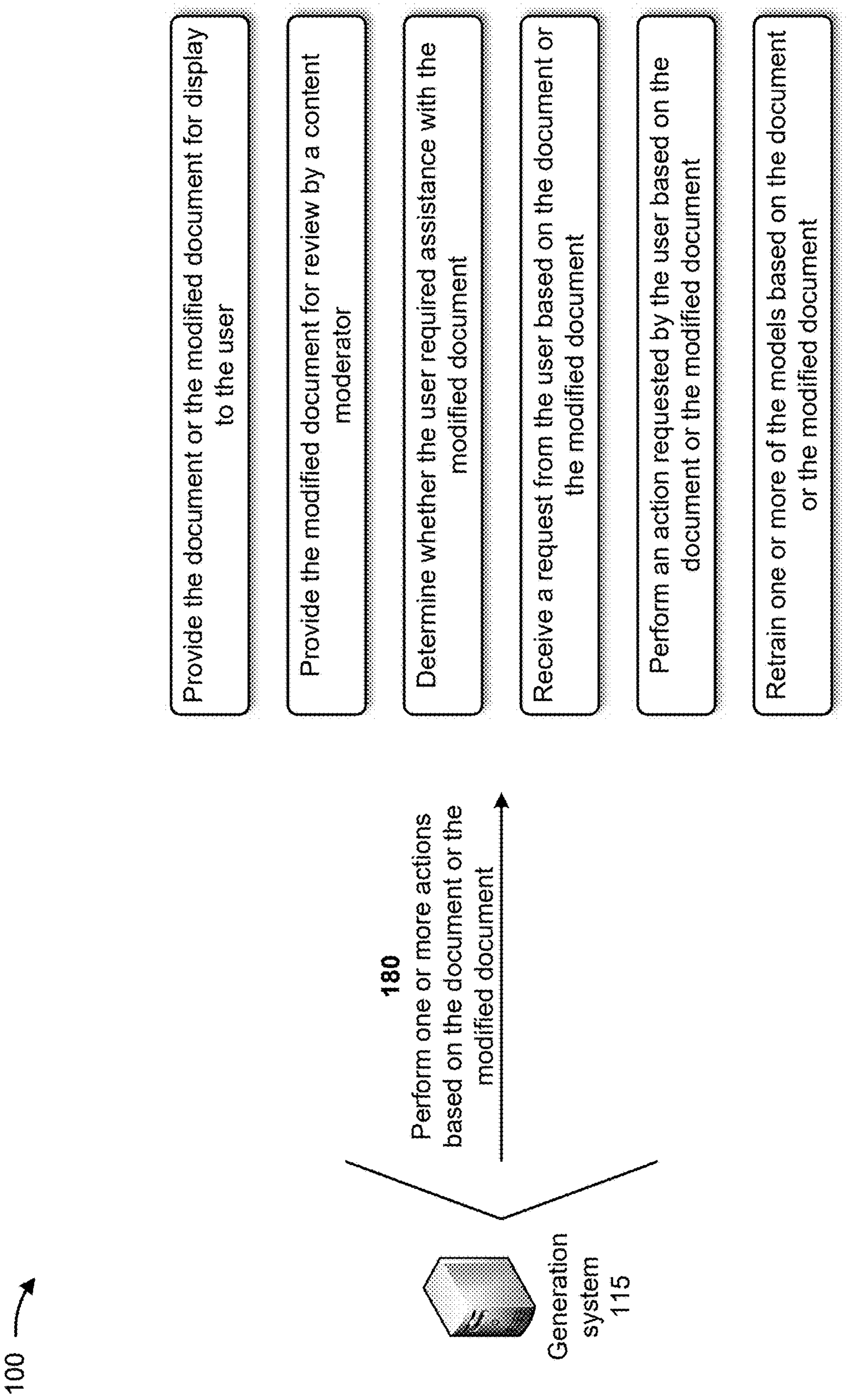

FIG. 1H

SYSTEMS AND METHODS FOR GENERATING PERSONALIZED CONTENT USING A LANGUAGE MODEL AND REINFORCEMENT TECHNIQUES

BACKGROUND

A self-help document may include a document that helps a customer understand an issue, a product, a service, and/or the like. Current adoption rates of self-help documents are extremely low.

BRIEF DESCRIPTION OF THE DRAWINGS

FIGS. 1A-1H are diagrams of an example associated with generating personalized content using a language model and reinforcement techniques.

DETAILED DESCRIPTION OF EXAMPLE EMBODIMENTS

Figure 1B:
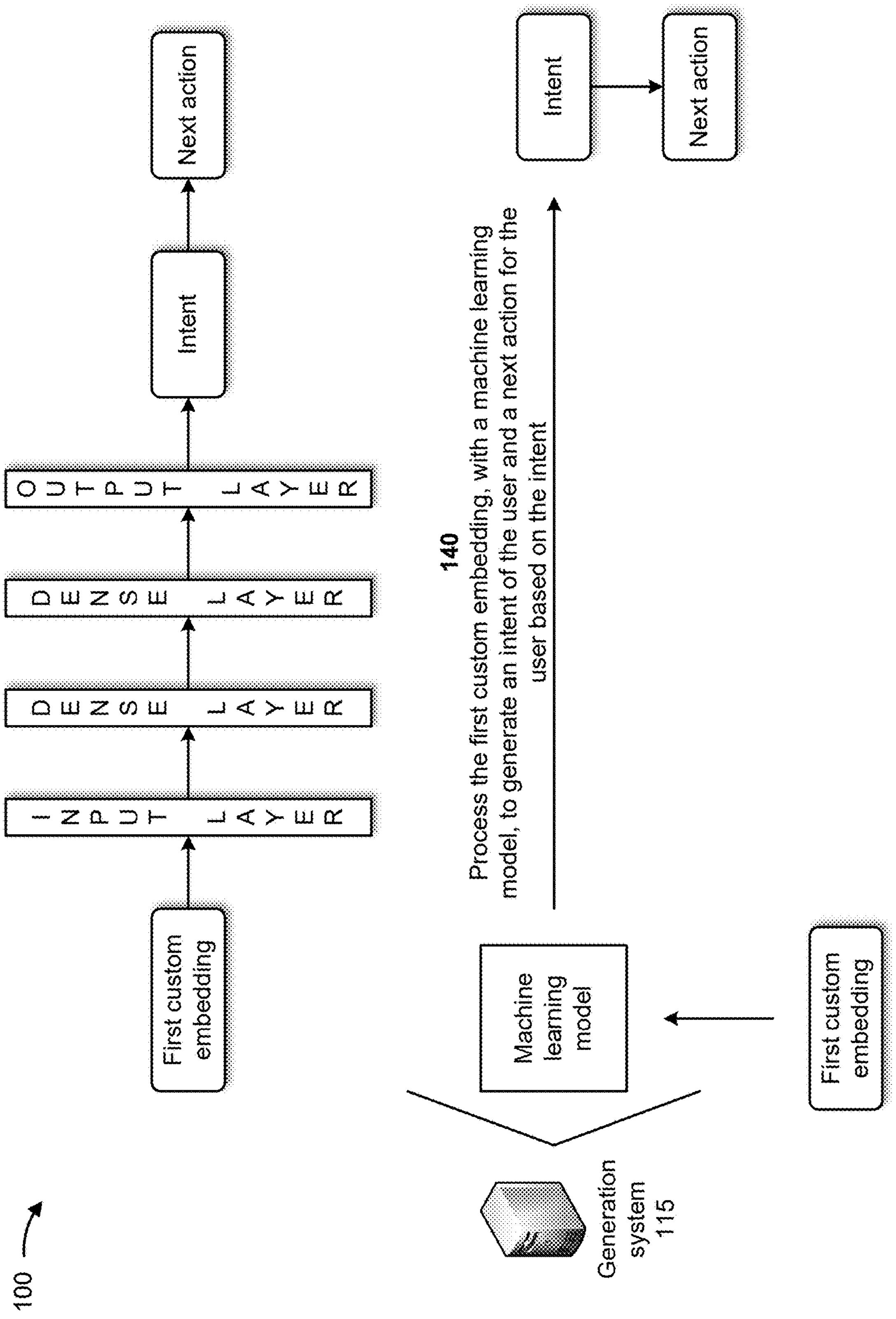

The following detailed description of example implementations refers to the accompanying drawings. The same reference numbers in different drawings may identify the same or similar elements.

Organizations and providers often provide a repository of self-help documents in order to address common issues (e.g., technical or service issues) associated with user's account and services or some other troubleshooting help they may need. A self-help document, when utilized by a customer, may prevent unnecessary calls from or with the customer, may reduce average handling time of customer issues, may provide faster resolutions for customer issues, may improve customer satisfaction, and/or the like. However, most self-help documents are manually generated by content authors using traditional approaches. However, customer intents may be very dynamic based on different situations (e.g., a product, demographics, emotions, operation issues, and/or the like) and customer content should be dynamic and personalized to each customer with local language support. Furthermore, self-help documents may not be updated frequently and may become out of date. They may also require an inordinate amount of time to modify. Currently, customers struggle with self-help documents due to ineffectively designed self-help documents unrelated to customer issues, outdated content of the self-help documents, confusing language, vocabulary, grammar, and/or the like in the self-help documents, and/or the like.

Thus, current techniques for providing self-help documents consume computing resources (e.g., processing resources, memory resources, communication resources, and/or the like), networking resources, and/or other resources associated with failing to automatically generate self-help documents, providing self-help documents that are not dynamic and personalized to customers, failing to automatically and frequently update self-help documents, providing self-help documents that are difficult to understand, and/or the like.

Some implementations described herein provide a generation system that generates personalized content using a language model and reinforcement techniques. For example, the generation system may receive user activity data identifying activities of a user, and content data identifying search data, chatbot transcripts and voice call text transcripts associated with the user. The generation system may generate a first custom embedding associated with the user based on the user activity data, and may process the first custom embedding, with a machine learning model, to generate an intent of the user and a next action for the user based on the intent. The generation system may process the content data to generate a second custom embedding for the user and an end user vector based on the second custom embedding, and may generate a document vector for the user based on the next action for the user. The generation system may process the document vector and the end user vector, with a language model, to generate a document for the user, and may perform one or more actions based on the document.

In this way, the generation system generates personalized content using a language model and reinforcement techniques. For example, the generation system may provide, to a user (e.g., a customer), proactive intelligent prompting with relevant self-help documents based on next action detection, and personalized self-help documentation based on user-specific characteristics. The generation system may automatically remove duplicate content from self-help documents using a clustering model, and may provide intelligent self-help document regeneration and validation based on user feedback reinforcement. Thus, the generation system may conserve computing resources, networking resources, and/or other resources that would have otherwise been consumed by failing to automatically generate self-help documents, providing self-help documents that are not dynamic and personalized to customers, failing to automatically and frequently update self-help documents, providing self-help documents that are difficult to understand, and/or the like.

FIGS. 1A-1H are diagrams of an example 100 associated with generating personalized content using a language model and reinforcement techniques. As shown in FIGS. 1A-1H, example 100 includes a user device 105 associated with a user, a data structure 110 (e.g., a database, a table, a list, and/or the like), and a generation system 115. Further details of the user device 105, the data structure 110, and the generation system 115 are provided elsewhere herein.

As shown in FIG. 1A, and by reference number 120, the generation system 115 may receive user activity data identifying activities of the user. For example, the user of the user device 105 may perform activities, such as activities associated with a call, a chatbot, a live chat, an interactive voice response (IVR) system, an analytics (e.g., a site catalyst) system, a search system, a support system, and/or the like. For example, the user device 105 (or another device, such as a server device, a cloud-based device, and/or the like) may provide a chatbot application, a live chat application, an IVR system application, a voice or video call application, an analytics system application, a search application, a support application, and/or the like. The user may utilize the applications to cause the user device 105 to conduct voice or video calls, conduct live chats, provide interactive voice responses to the IVR system, provide inputs to chatbots, provide inputs to the analytics system, conduct searches, submit support tickets to the support system, and/or the like. The user device 105 may convert the voice or video calls from audio data to text data (e.g., call transcripts), may save the text data input via the live chats and the chatbots, may convert the interactive voice responses from audio data to text data, may save the inputs to the analytics system, may save the searches, may save the support tickets, and/or the like. The user device 105 may provide the saved data (e.g., the user activity data) to the generation system 115, and the generation system 115 may receive the user activity data. In some implementations, the generation system 115 may continuously receive the user activity data in real time from the user device 105, may periodically receive the user activity data from the user device 105, may receive the user activity data from the user device 105 based on requesting the user activity data, and/or the like.

As further shown in FIG. 1A, and by reference number 125, the generation system 115 may receive content data identifying text transcripts associated with the user. For example, the data structure 110 may store content data identifying text transcripts associated with the user of the user device (e.g., from voice or video calls, from chatbots, from live chats, from an IVR system), a vocabulary of the user, emotions of the user, grammar of the user, demographics of the user, a language preference of the user, product and/or service features associated with the user, and/or the like. The data structure 110 may provide the content data identifying text transcripts associated with the user to the generation system 115, and the generation system 115 may receive the content data from the data structure 110. In some implementations, the generation system 115 may continuously receive the content data in real time from the data structure 110, may periodically receive the content data from the data structure, may receive the content data from the data structure 110 based on requesting the content data from the data structure 110, and/or the like.

As further shown in FIG. 1A, and by reference number 130, the generation system 115 may generate a first custom embedding associated with the user based on the user activity data. For example, the generation system 115 may generate the first custom embedding associated with the user by using a predictor or an autoencoder. If the generation system 115 utilizes a predictor, the generation system 115 may train the predictor by selecting features from the user activity data as training labels for a deep neural network (DNN) model (e.g., the predictor) that are important in determining similarity in the user activity data. The features of the user activity data that are selected as the training labels may be removed as input data to the DNN model. The generation system 115 may train the DNN model by utilizing other features of the user activity data as input data. If the generation system 115 utilizes an autoencoder, the generation system 115 may train the autoencoder based on the user activity data as follows. The generation system 115 may set hidden layers of the autoencoder to be smaller than input and output layers, may calculate a loss for each output, and may create a loss function by summing losses for each output. The generation system 115 may train the DNN model (e.g., the autoencoder) with the user activity data. After training the DNN model, whether predictor or autoencoder or another type, the generation system may extract the first custom embedding from the DNN model based on the user activity data. For example, the generation system 115 may utilize the user activity data as input, and may read outputs of a final hidden layer. The outputs may form the first custom embedding.

As further shown in FIG. 1A, and by reference number 135, the generation system 115 may process the content data, with a clustering model, to remove duplicate content from the content data. For example, the generation system 115 may be associated with a clustering model, and may derive features from the content data and/or the user activity data, such as, for example, a plan type, a product type, a service type, a title, an intent derived from the title, a click rate, a repeat call rate, a quantity of clicks, a quantity of calls, a quantity of repeat calls, a chat rate, a quantity of chats, a quantity of repeat chats, and/or the like. The generation system 115 may process the features from the content data and/or the user activity data, with the clustering model, to generate clusters of features. The generation system 115 may derive similarity matrices for the features in the clusters, and may remove the duplicate content from the content data based on the similarity matrices. In some implementations, the generation system 115 may sort similar content based on a parameter (e.g., a repeat call rate) in ascending order, may retain the first similar content in the order (e.g., with the content data), and may archive other content in the order (e.g., as being duplicate content).

As shown in FIG. 1B, and by reference number 140, the generation system 115 may process the first custom embedding, with a machine learning model, to generate an intent of the user and a next action for the user based on the intent. For example, the generation system 115 may be associated with a machine learning model. In some implementations, the machine learning model may be a sequential multilayer perceptron model with an input layer, one or more dense layers, and an output layer. The sequential multilayer perceptron model may include fully connected dense layers, a leaky rectified linear unit (Leaky ReLU), and a categorical cross-entropy loss function. The generation system 115 may utilize the machine learning model to generate the intent of the user based on the first custom embedding. The intent of the user may include a query intent, a search intent, or an identification and categorization of what a user intended or wanted to find when the user typed terms or spoke terms. For example, the intent of the user may include fact-checking, issue resolution, search results, comparison shopping, navigating to other websites, product inquiries, service inquiries, and/or the like.

The generation system 115 may generate the next action for the user based on the intent of the user. For example, if the generation system 115 determines that the intent of the user is to resolve an issue with an Internet connection, the generation system 115 may determine that the next action for the user is to generate a service ticket for resolution of the Internet connection issue. In another example, if the generation system 115 determines that the intent of the user is to purchase a new mobile telephone, the generation system 115 may determine that the next action for the user is to display all available mobile telephones (e.g., along with pictures of the mobile telephones, features of the mobile telephones, prices of the mobile telephones, and/or the like) to the user via the user device 105.

Figure 1C:
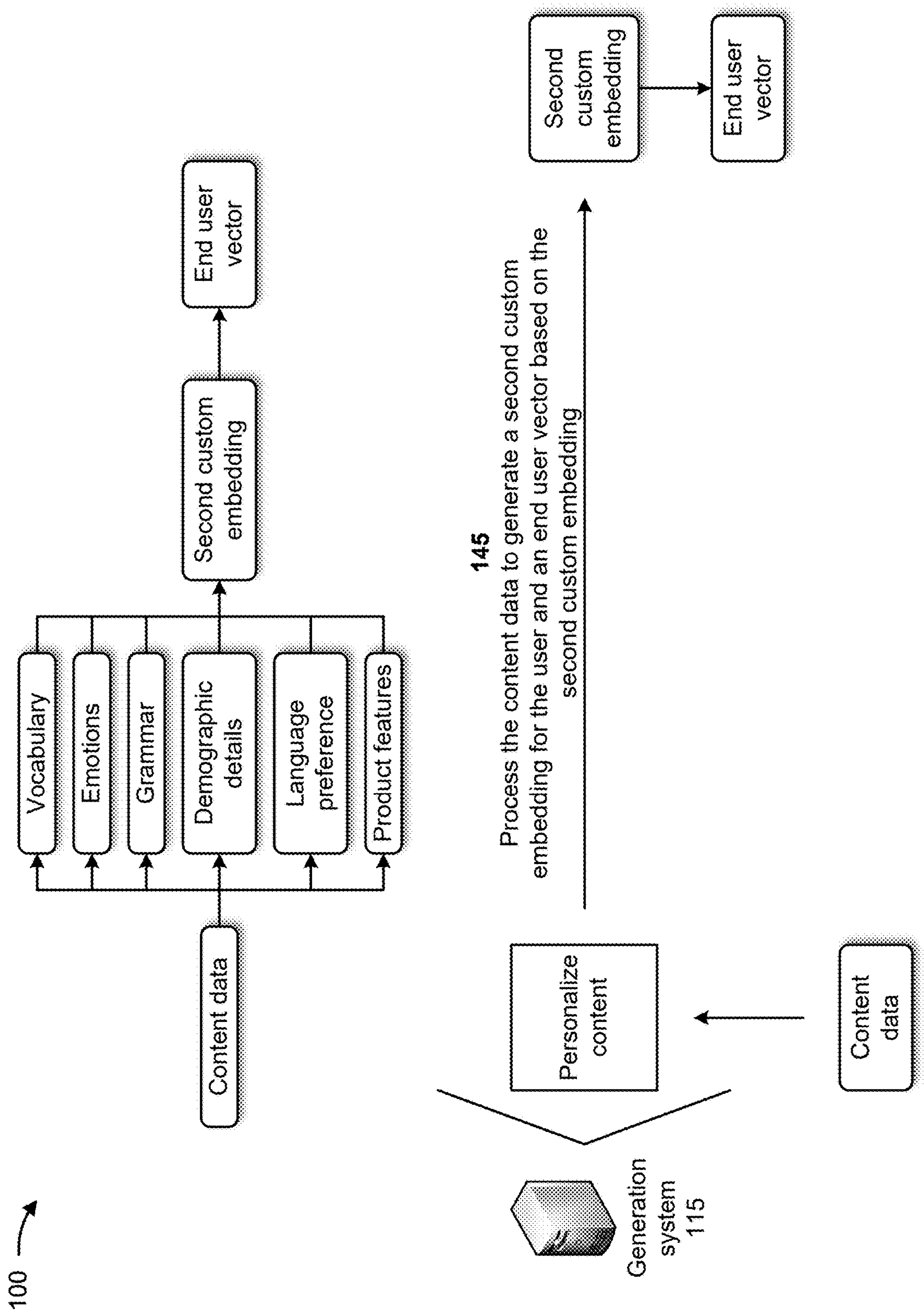

As shown in FIG. 1C, and by reference number 145, the generation system 115 may process the content data to generate a second custom embedding for the user and an end user vector based on the second custom embedding. For example, the generation system 115 may generate the second custom embedding for the user by using a predictor or an autoencoder. If the generation system 115 utilizes a predictor, the generation system 115 may train the predictor by selecting features from the content data as training labels for a DNN model (e.g., the predictor) that are important in determining similarity in the content data. The features of the content data that are selected as the training labels may be removed as input data to the DNN model. The generation system 115 may train the DNN model by utilizing other features of the content data as input data. If the generation system 115 utilizes an autoencoder, the generation system 115 may train the autoencoder based on the content data as follows. The generation system 115 may set hidden layers of the autoencoder to be smaller than input and output layers, may calculate a loss for each output, and may create a loss function by summing losses for each output. The generation system 115 may train the DNN model (e.g., the autoencoder) with the content data. After training the DNN model, whether predictor or autoencoder, the generation system may extract the second custom embedding from the DNN model based on the content data. For example, the generation system 115 may utilize the content data as input, and may read outputs of a final hidden layer. The outputs may form the second custom embedding.

In some implementations, the generation system 115 may generate the end user vector based on the second custom embedding. For example, the second custom embedding may include a representation of an object (e.g., the content data) summarized as numbers. The end user vector may include an array of the numbers of the second custom embedding. In some implementations, the generation system 115 may arrange the numbers of the second custom embedding as the array to generate the end user vector.

Figure 1D:
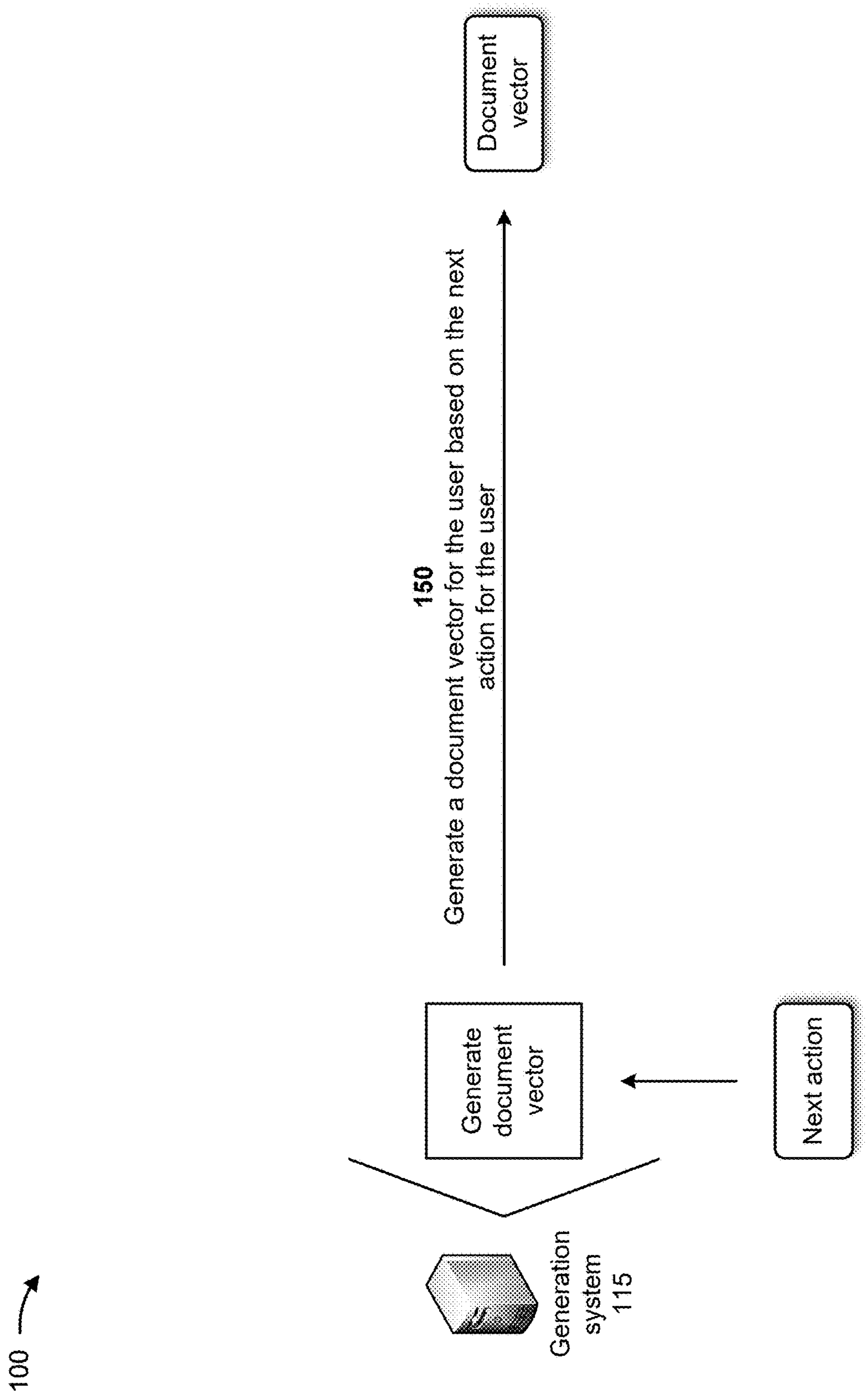

As shown in FIG. 1D, and by reference number 150, the generation system 115 may generate a document vector for the user based on the next action for the user. For example, the next action for the user may include providing a generic document (e.g., a web page, a user interface, an image, a text document, a service ticket, and/or the like) to the user of the user device 105. In some implementations, the generic document may include a self-help document that helps a customer (e.g., the user) understand an issue, a product, a service, and/or the like. In some implementations, the generic document may not be personalized for the user. The generation system 115 may generate the generic document based on the next action for the user, and may convert the generic document into a document vector. In some implementations, the generation system 115 may convert the generic document (e.g., that includes words, sentences, images, and/or the like) into numerical values and may arrange the values as an array of numbers (e.g., the document vector).

Figure 1E:
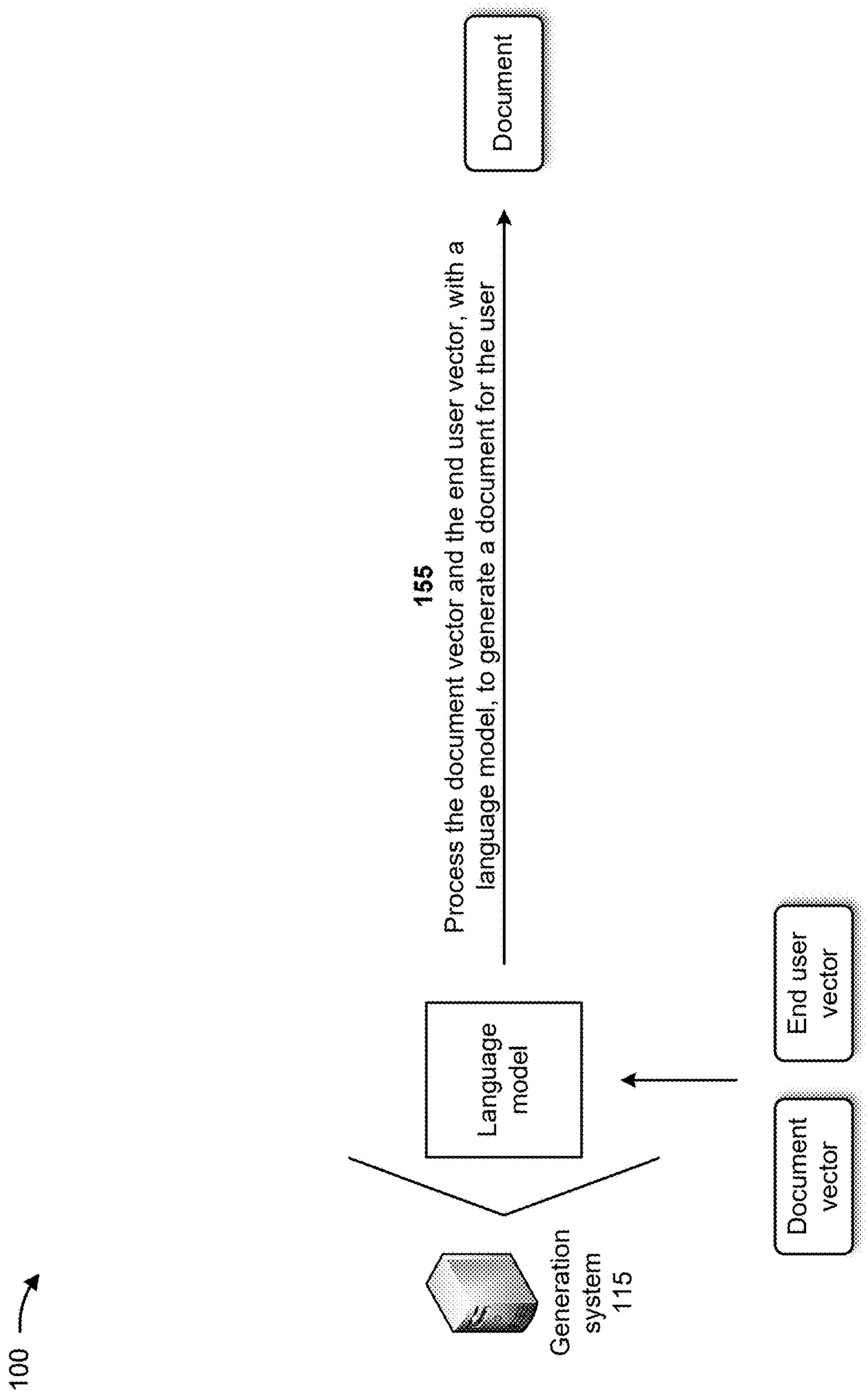

As shown in FIG. 1E, and by reference number 155, the generation system 115 may process the document vector and the end user vector, with a language model, to generate a document for the user. For example, the generation system 115 may be associated with a language model, such as large language model. A large language model is a type of language model that achieves general-purpose language understanding and generation by using massive amounts of data to learn billions of parameters during training. The generation system may utilize the language model to generate the document for the user based on the document vector and the end user vector. In some implementations, the document may be a self-help document that is personalized for the user. For example, the language model may modify the generic document represented by the document vector, based on the end user vector, to generate the document that is personalized for the user.

Figure 1F:
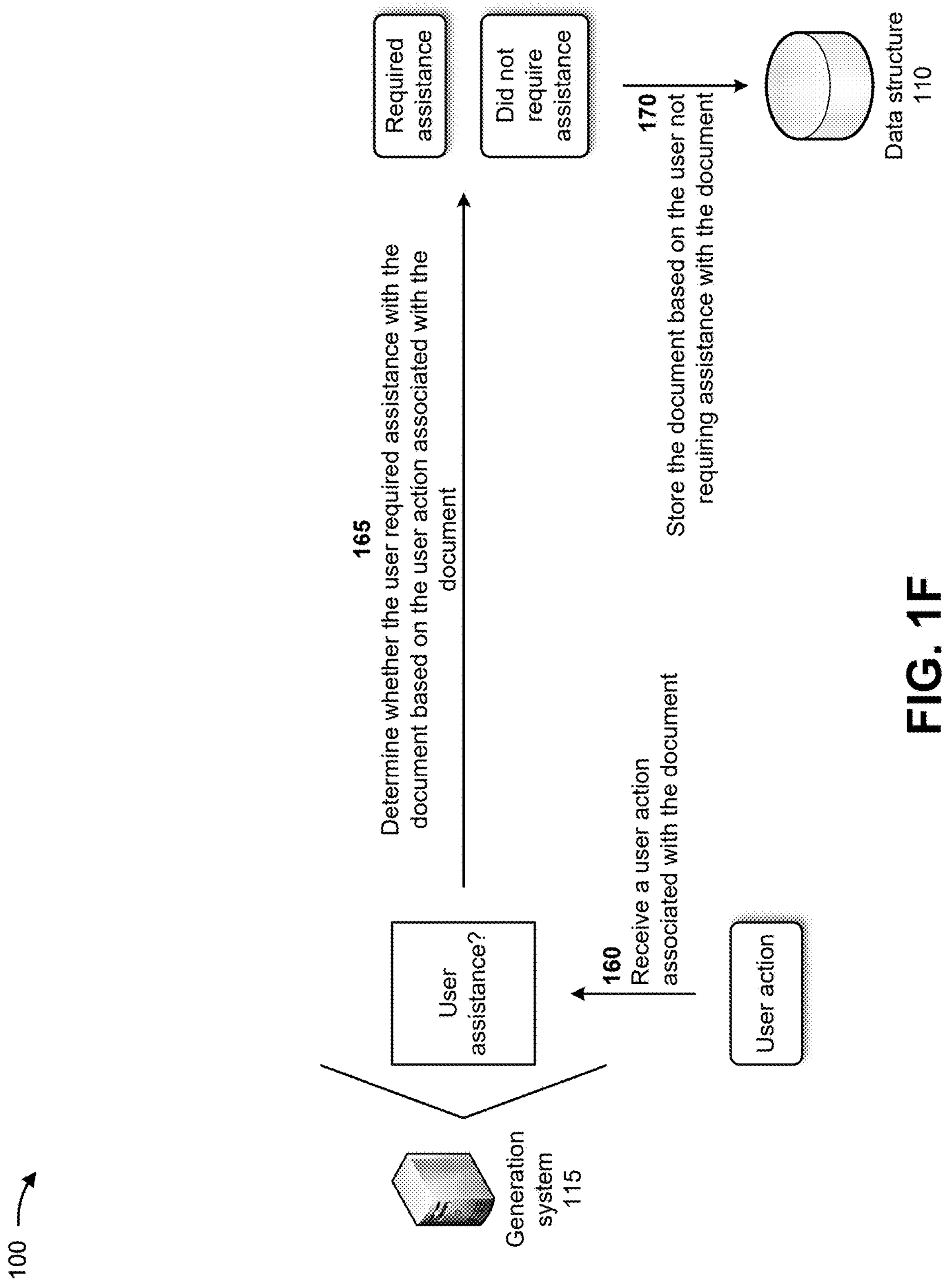

As shown in FIG. 1F, and by reference number 160, the generation system 115 may receive a user action associated with the document. For example, the generation system 115 may provide the document to the user device 105 and the user device 105 may display the document to the user. The user may perform the user action associated with the document, such as requiring assistance with the document (e.g., via interaction with the user device 105), not requiring assistance with the document, generating search results associated with the document, generating additional documents based on the document, recommending documents associated with the document, and/or the like. When the user requires assistance with the document, the user device 105 may provide an indication of the required assistance to the generation system 115. When the user does not require assistance with the document, the user device 105 may not provide an indication to the generation system 115.

As further shown in FIG. 1F, and by reference number 165, the generation system 115 may determine whether the user required assistance with the document based on the user action associated with the document. For example, when the user device 105 provides, to the generation system 115, the indication of the required assistance with the document, the generation system 115 may determine that the user required assistance with the document based on the user action associated with the document. Alternatively, when the user device 105 does not provide, to the generation system 115, the indication of the required assistance with the document, the generation system 115 may determine that the user did not require assistance with the document based on the user action associated with the document.

As further shown in FIG. 1F, and by reference number 170, the generation system 115 may store the document based on the user not requiring assistance with the document. For example, when the generation system 115 determines that the user did not require assistance with the document based on the user action associated with the document, the generation system 115 may determine that the document is useful, fulfilling the need of the user and does not require modification. In some implementations, the generation system 115 may store the document in the data structure 110 for future use.

Figure 1G:
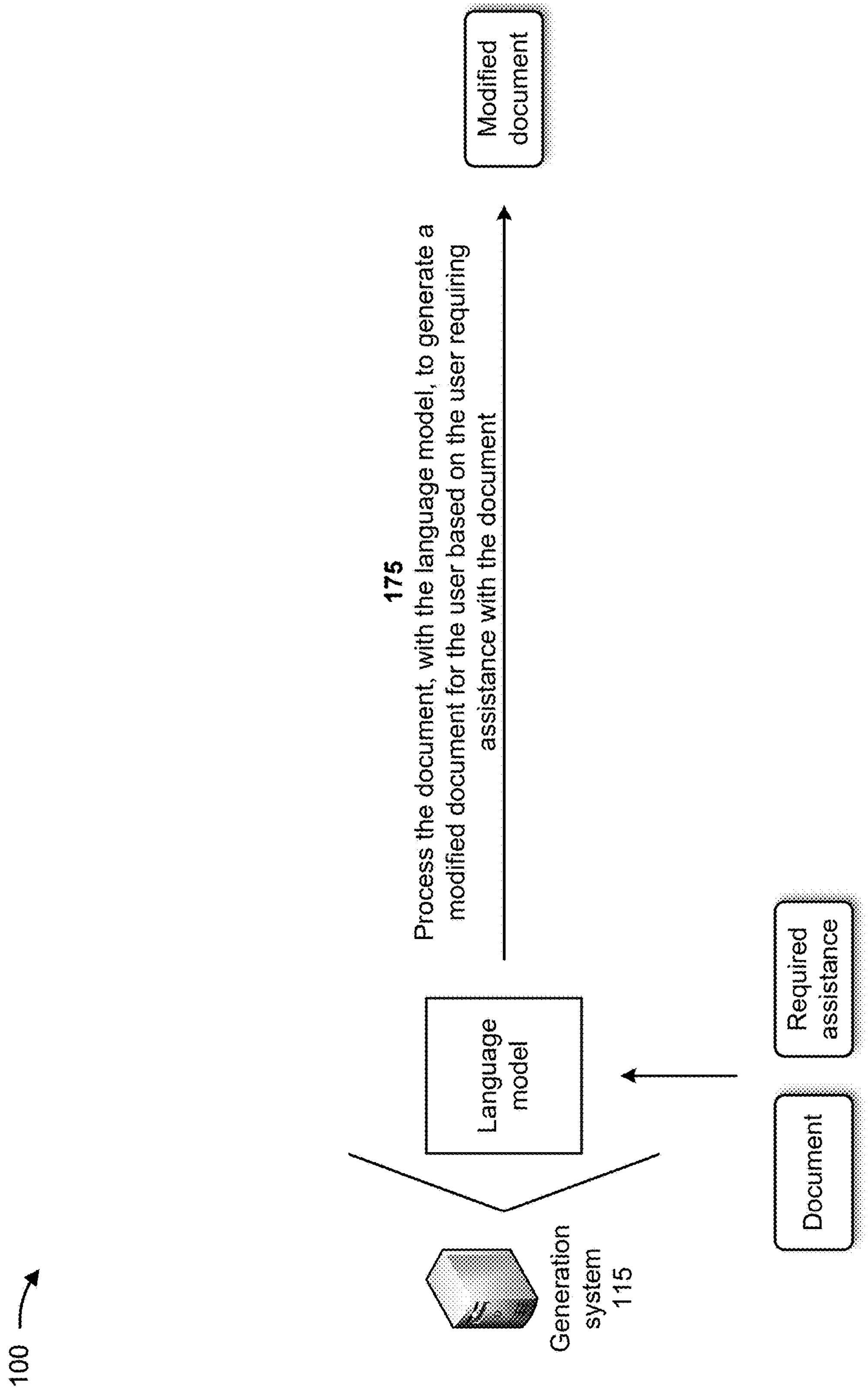

As shown in FIG. 1G, and by reference number 175, the generation system 115 may process the document, with the language model, to generate a modified document for the user based on the user requiring assistance with the document. For example, when the generation system 115 determines that the user required assistance with the document based on the user action associated with the document, the generation system 115 may determine that the document needs to be modified. The generation system 115 may utilize the language model described above to generate the modified document based on the document. In some implementations, the modified document may be a self-help document that is further personalized for the user. For example, the language model may further modify the document to generate the modified document that is further personalized for the user.

As shown in FIG. 1H, and by reference number 180, the generation system 115 may perform one or more actions based on the document or the modified document. In some implementations, performing the one or more actions includes the generation system 115 providing the document or the modified document for display to the user. For example, the generation system 115 may provide the document or the modified document to the user device 105, and the user device 105 may display the document or the modified document to first user. The user may utilize the document or the modified document to perform further user actions (e.g., correct an issue, purchase a product, and/or the like). In this way, the generation system 115 conserves computing resources, networking resources, and/or other resources that would have otherwise been consumed by failing to automatically generate self-help documents.

In some implementations, performing the one or more actions includes the generation system 115 providing the modified document for review by a content moderator. For example, after generating the modified document, the generation system 115 may provide the modified document for display to a content moderator. The content moderator may review the modified document to determine whether the modified document provides useful and personalized information to the user (e.g., that prevents repeat calls, chats, and/or the like). In this way, the generation system 115 conserves computing resources, networking resources, and/or other resources that would have otherwise been consumed by providing self-help documents that are not dynamic and personalized to customers.

In some implementations, performing the one or more actions includes the generation system 115 determining whether the user required assistance with the modified document. For example, the generation system 115 may provide the modified document to the user device 105 and the user device 105 may display the modified document to the user. The user may perform a user action associated with the modified document, such as requiring assistance with the modified document (e.g., via interaction with the user device 105), not requiring assistance with the modified document, and/or the like. When the user required assistance with the modified document, the user device 105 may provide an indication of the required assistance to the generation system 115. When the user did not require assistance with the modified document, the user device 105 may not provide an indication to the generation system 115. In this way, the generation system 115 conserves computing resources, networking resources, and/or other resources that would have otherwise been consumed by failing to automatically and frequently update self-help documents.

In some implementations, performing the one or more actions includes the generation system 115 receiving a request from the user based on the document or the modified document. For example, the generation system 115 may provide the document or the modified document to the user device 105, and the user device 105 may display the document or the modified document to first user. The user may utilize the user device 105 to request further information associated with the document or the modified document, and the generation system 115 may provide the further information to the user device 105. In this way, the generation system 115 conserves computing resources, networking resources, and/or other resources that would have otherwise been consumed by providing self-help documents that are difficult to understand.

In some implementations, performing the one or more actions includes the generation system 115 performing an action requested by the user based on the document or the modified document. For example, the generation system 115 may provide the document or the modified document to the user device 105, and the user device 105 may display the document or the modified document to first user. The user may utilize the user device 105 to request an action (e.g., order a product or a service) associated with the document or the modified document, and the generation system 115 may perform the requested action for the user. In this way, the generation system 115 conserves computing resources, networking resources, and/or other resources that would have otherwise been consumed by providing self-help documents that are not dynamic and personalized to customers.

In some implementations, performing the one or more actions includes the generation system 115 retraining one or more of the language model, the machine learning model, and/or the clustering model based on the document or the modified document. For example, the generation system 115 may utilize the document or the modified document as additional training data for retraining one or more of the language model, the machine learning model, and/or the clustering model, thereby increasing the quantity of training data available for training one or more of the language model, the machine learning model, and/or the clustering model. Accordingly, the generation system 115 may conserve computing resources associated with identifying, obtaining, and/or generating historical data for training one or more of the language model, the machine learning model, and/or the clustering model relative to other systems for identifying, obtaining, and/or generating historical data for training machine learning models.

In this way, the generation system 115 generates personalized content using a language model and reinforcement techniques. For example, the generation system 115 may provide, to a user (e.g., a customer), proactive intelligent prompting with relevant self-help documents based on next action detection, and personalized self-help documentation based on user-specific characteristics. The generation system 115 may automatically remove duplicate content from self-help documents using a clustering model, and may provide intelligent self-help document regeneration and validation based on user feedback reinforcement. Thus, the generation system 115 may conserve computing resources, networking resources, and/or other resources that would have otherwise been consumed by failing to automatically generate self-help documents, providing self-help documents that are not dynamic and personalized to customers, failing to automatically and frequently update self-help documents, providing self-help documents that are difficult to understand, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
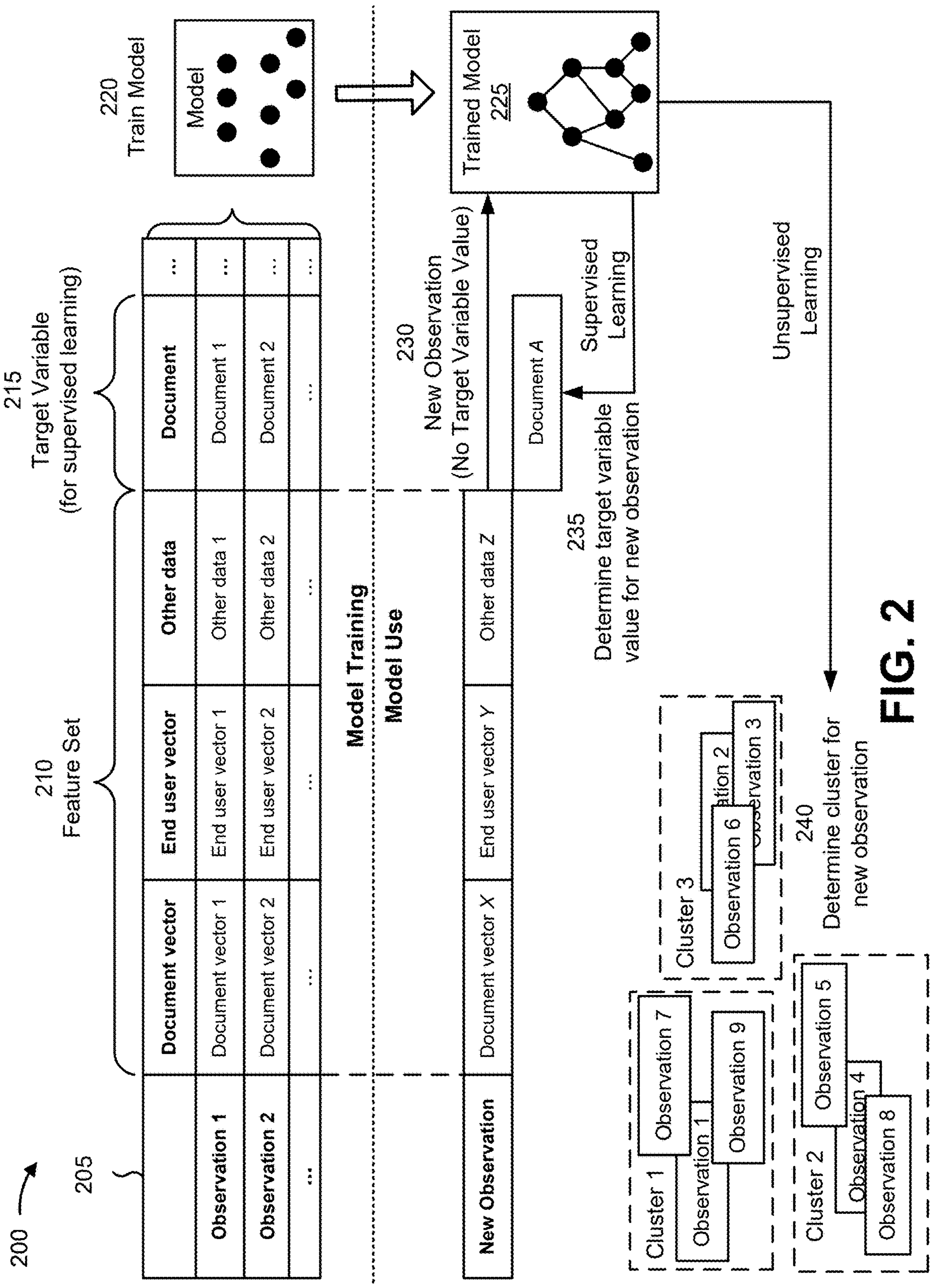
FIG. 2 is a diagram illustrating an example of training and using a machine learning model.

FIG. 2 is a diagram illustrating an example 200 of training and using a machine learning model to generate personalized content. The machine learning model training and usage described herein may be performed using a machine learning system. The machine learning system may include or may be included in a computing device, a server, a cloud computing environment, and/or the like, such as the generation system 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the generation system 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the generation system 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a document vector, a second feature of an end user vector, a third feature of other data, and so on. As shown, for a first observation, the first feature may have a value of document vector 1, the second feature may have a value of end user vector 1, the third feature may have a value of other data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labeled "document" and may include a value of document 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of document vector X, a second feature of end user vector Y, a third feature of other data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of document A for the target variable of the summary for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a document vector cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an end user vector cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to generate personalized content. The machine learning system enables recognition and/or identification of tens, hundreds, thousands, or millions of features and/or feature values for tens, hundreds, thousands, or millions of observations, thereby increasing accuracy and consistency and reducing delay associated with generating personalized content relative to requiring computing resources to be allocated for tens, hundreds, or thousands of operators to manually generate personalized content.

As indicated above, FIG. 2 is provided as an example. Other examples may differ from what is described in connection with FIG. 2.

Figure 3:
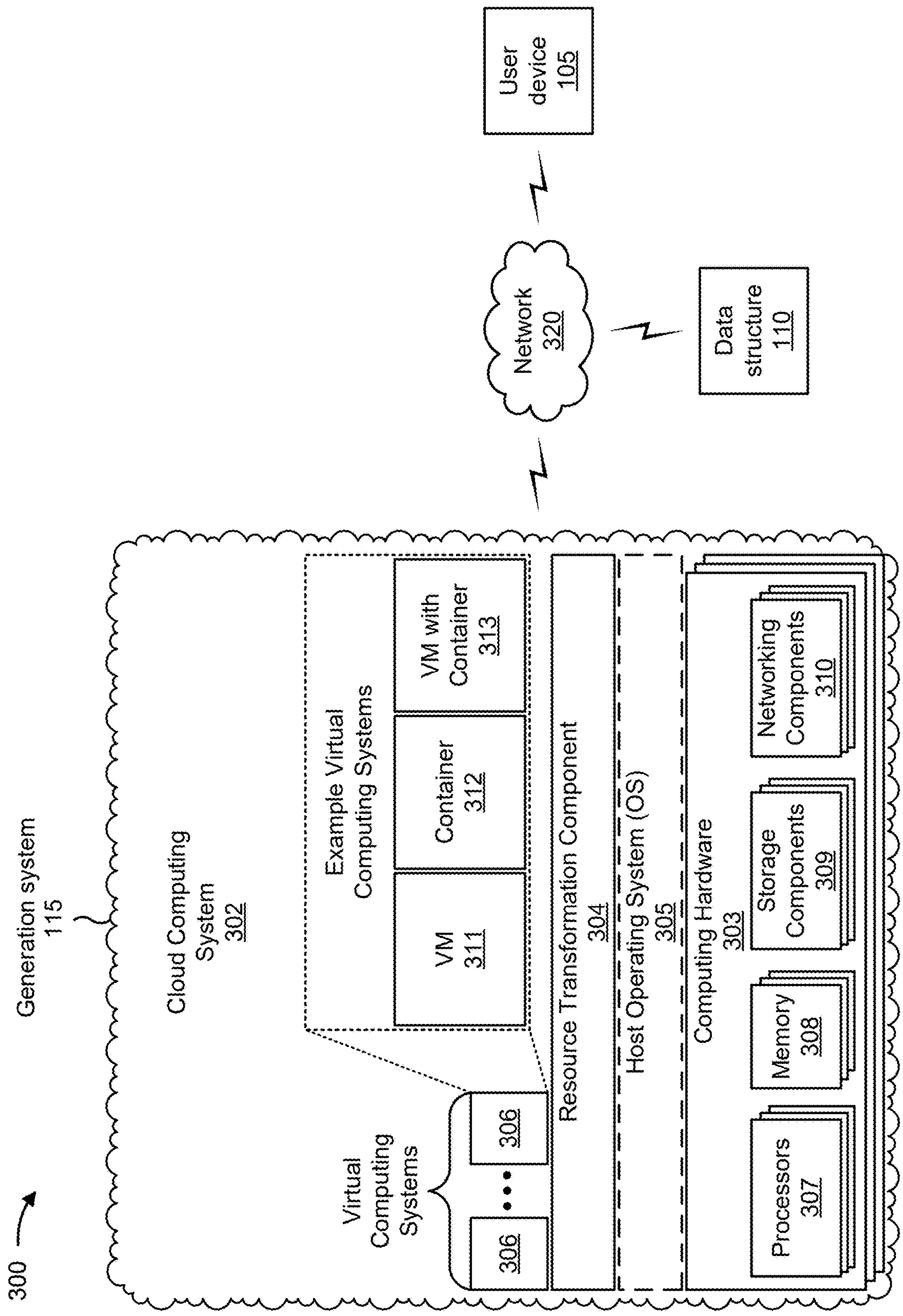
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the generation system 115, which may include one or more elements of and/or may execute within a cloud computing system 302. The cloud computing system 302 may include one or more elements 303-313, as described in more detail below. As further shown in FIG. 3, the environment 300 may include the user device 105, the data structure 110, and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), an autonomous vehicle, or a similar type of device.

The data structure 110 may include one or more devices capable of receiving, generating, storing, processing, and/or providing information, as described elsewhere herein. The data structure 110 may include a communication device and/or a computing device. For example, the data structure 110 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 110 may communicate with one or more other devices of the environment 300, as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the generation system 115 may include one or more elements 303-313 of the cloud computing system 302, may execute within the cloud computing system 302, and/or may be hosted within the cloud computing system 302, in some implementations, the generation system 115 may not be cloud-based (e.g., may be implemented outside of a cloud computing system) or may be partially cloud-based. For example, the generation system 115 may include one or more devices that are not part of the cloud computing system 302, such as the device 400 of FIG. 4, which may include a standalone server or another type of computing device. The generation system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
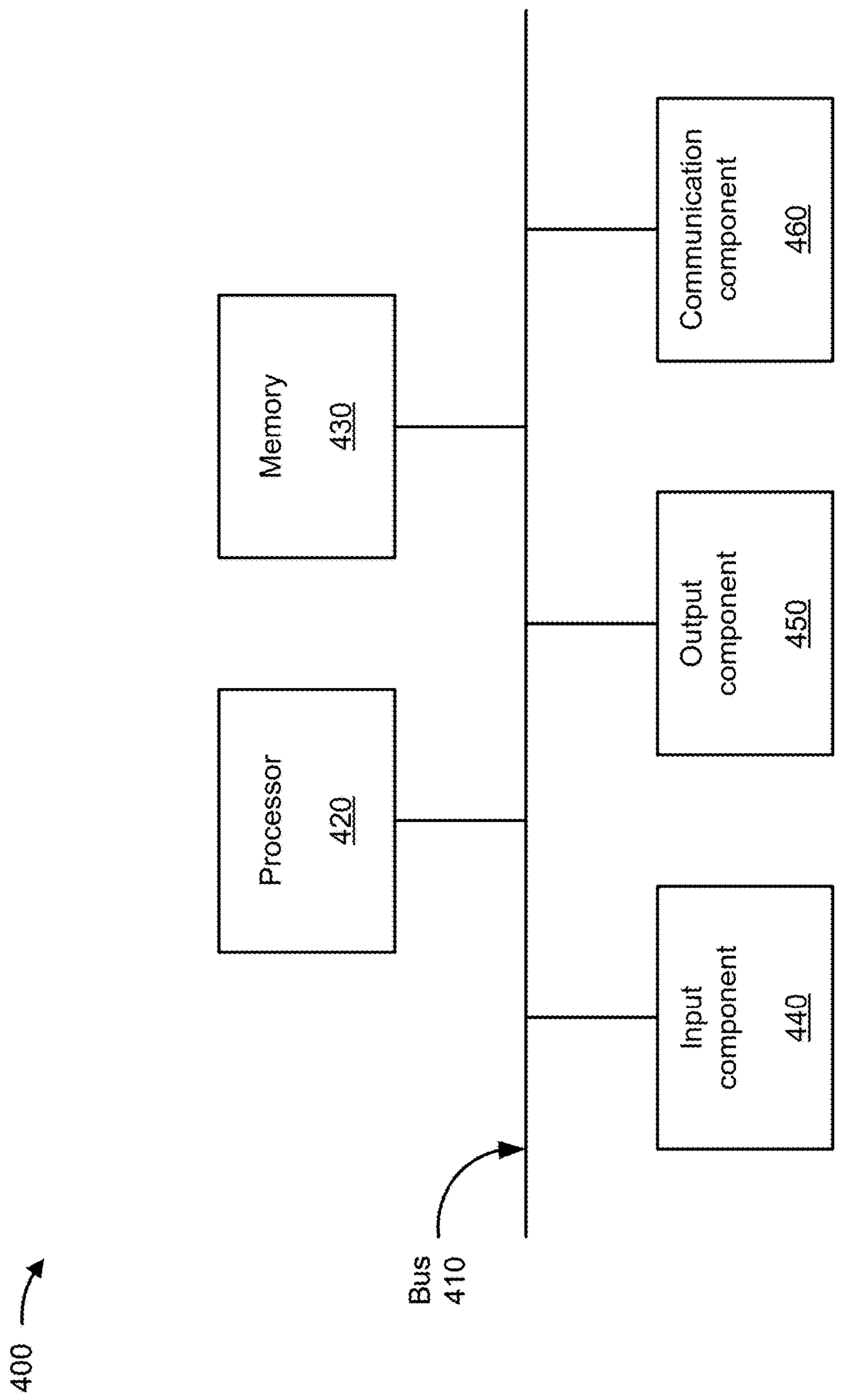
FIG. 4 is a diagram of example components of one or more devices of FIG. 3.

FIG. 4 is a diagram of example components of a device 400, which may correspond to the user device 105, the data structure 110, and/or the generation system 115. In some implementations, the user device 105, the data structure 110, and/or the generation system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
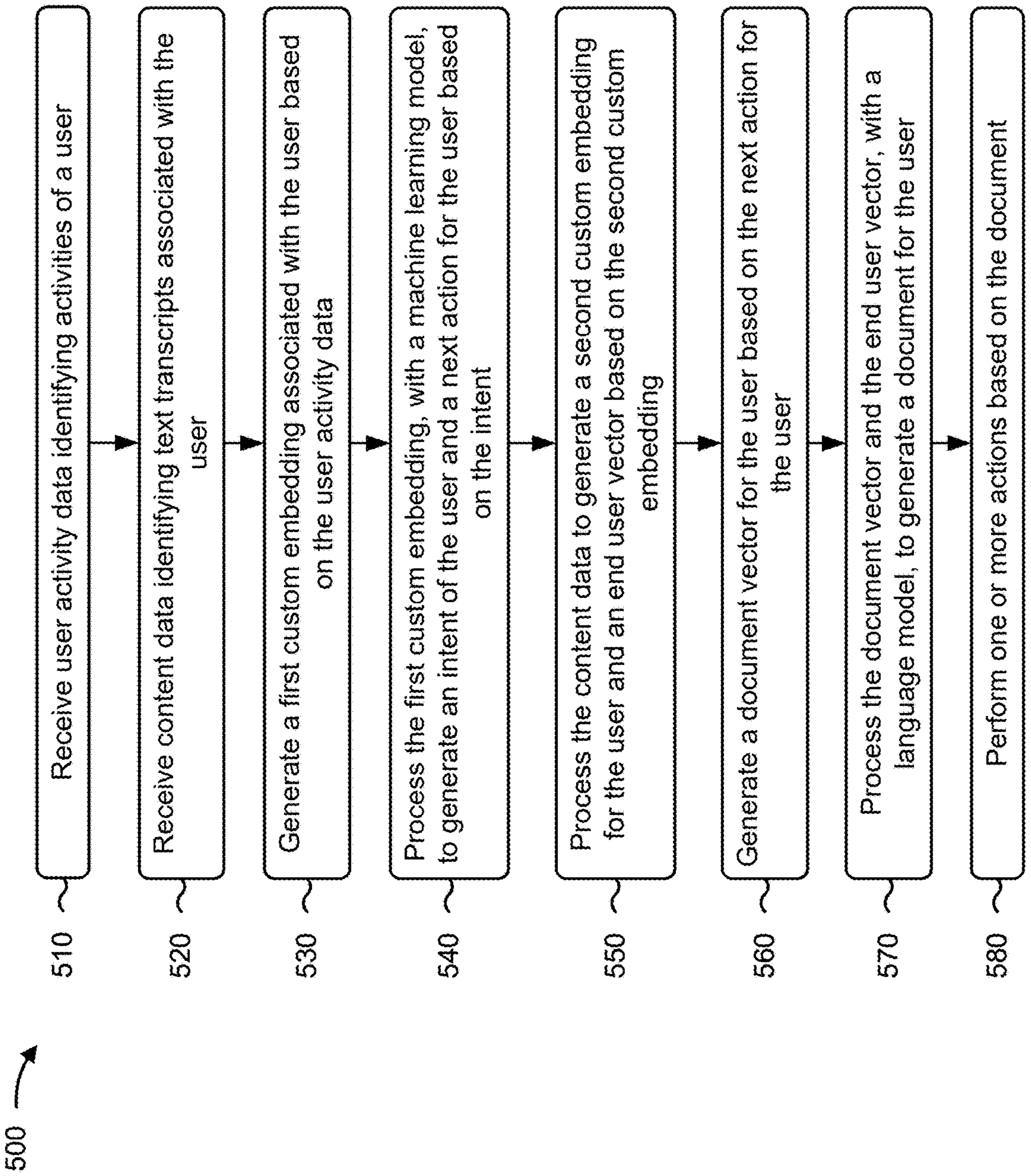
FIG. 5 is a flowchart of an example process for generating personalized content using a language model and reinforcement techniques.

FIG. 5 is a flowchart of an example process 500 for generating personalized content using a language model and reinforcement techniques. In some implementations, one or more process blocks of FIG. 5 may be performed by a device (e.g., the generation system 115). In some implementations, one or more process blocks of FIG. 5 may be performed by another device or a group of devices separate from or including the device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving user activity data identifying activities of a user (block 510). For example, the device may receive user activity data identifying activities of a user, as described above. In some implementations, the user activity data includes data identifying one or more of historical call intents of the user, historical chat intents of the user, events associated with the user, transactions associated with the user, site catalyst data associated with the user, searches performed by the user, remarks provided by the user, or support tickets associated with the user.

As further shown in FIG. 5, process 500 may include receiving content data identifying text transcripts associated with the user (block 520). For example, the device may receive content data identifying text transcripts associated with the user, as described above. In some implementations, the content data includes data identifying one or more of a vocabulary of the user, emotions of the user, grammar of the user, demographics of the user, a language preference of the user, or product features associated with the user.

As further shown in FIG. 5, process 500 may include generating a first custom embedding associated with the user based on the user activity data (block 530). For example, the device may generate a first custom embedding associated with the user based on the user activity data, as described above.

As further shown in FIG. 5, process 500 may include processing the first custom embedding, with a machine learning model, to generate an intent of the user and a next action for the user based on the intent (block 540). For example, the device may process the first custom embedding, with a machine learning model, to generate an intent of the user and a next action for the user based on the intent, as described above. In some implementations, the machine learning model is a sequential multilayer perceptron model.

As further shown in FIG. 5, process 500 may include processing the content data to generate a second custom embedding for the user and an end user vector based on the second custom embedding (block 550). For example, the device may process the content data to generate a second custom embedding for the user and an end user vector based on the second custom embedding, as described above.

As further shown in FIG. 5, process 500 may include generating a document vector for the user based on the next action for the user (block 560). For example, the device may generate a document vector for the user based on the next action for the user, as described above.

As further shown in FIG. 5, process 500 may include processing the document vector and the end user vector, with a language model, to generate a document for the user (block 570). For example, the device may process the document vector and the end user vector, with a language model, to generate a document for the user, as described above. In some implementations, the language model is a large language model. In some implementations, the document is a self-help document for the user.

As further shown in FIG. 5, process 500 may include performing one or more actions based on the document (block 580). For example, the device may perform one or more actions based on the document, as described above. In some implementations, performing the one or more actions includes one or more of providing the document for display to the user, receiving a request from the user based on the document, performing an action requested by the user based on the document, or retraining the language model or the machine learning model based on the document.

In some implementations, process 500 includes receiving a user action associated with the document; determining that the user did not require assistance with the document based on the user action associated with the document; and storing the document based on the user not requiring assistance with the document. In some implementations, process 500 includes receiving a user action associated with the document; determining that the user required assistance with the document based on the user action associated with the document; processing the document, with the language model, to generate a modified document for the user based on the user requiring assistance with the document; and performing one or more actions based on the modified document.

In some implementations, performing the one or more actions includes one or more of providing the modified document for display to the user, providing the modified document for review by a content moderator, or determining whether the user required assistance with the modified document. In some implementations, performing the one or more actions includes one or more of receiving a request from the user based on the modified document, performing an action requested by the user based on the modified document, or retraining the language model or the machine learning model based on the modified document.

In some implementations, process 500 includes processing the content data, with a clustering model, to remove duplicate content from the content data. In some implementations, processing the content data, with the clustering model, to remove the duplicate content from the content data includes deriving features from the content data, clustering the features into clusters, deriving similarity matrices for the features in the clusters, and removing the duplicate content from the content data based on the similarity matrices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, user activity data identifying activities of a user;

receiving, by the device, content data identifying text transcripts associated with the user;

generating, by the device, a first custom embedding associated with the user based on the user activity data;

processing, by the device, the first custom embedding, with a machine learning model, to generate an intent of the user and a next action for the user based on the intent;

processing, by the device, the content data to generate a second custom embedding for the user and an end user vector based on the second custom embedding;

generating, by the device, a document vector for the user based on the next action for the user;

processing, by the device, the document vector and the end user vector, with a language model, to generate a document for the user;

performing, by the device, one or more actions based on the document;

receiving a user action associated with the document;

determining that the user required assistance with the document based on the user action associated with the document;

generating a modified document for the user based on the user requiring assistance with the document; and performing one or more actions based on the modified document.

2. The method of claim 1, further comprising:

determining that the user did not require assistance with the document based on the user action associated with the document; and storing the document based on the user not requiring assistance with the document.

3. The method of claim 1, wherein generating the modified document for the user based on the user requiring assistance with the document comprises:

processing the document, with the language model, to generate the modified document for the user based on the user requiring assistance with the document.

4. The method of claim 3, wherein performing the one or more actions based on the modified document comprises one or more of:

providing the modified document for display to the user;

providing the modified document for review by a content moderator; or determining whether the user required assistance with the modified document.

5. The method of claim 3, wherein performing the one or more actions based on the modified document comprises one or more of:

receiving a request from the user based on the modified document;

performing an action requested by the user based on the modified document; or retraining the language model or the machine learning model based on the modified document.

6. The method of claim 1, further comprising:

processing the content data, with a clustering model, to remove duplicate content from the content data.

7. The method of claim 6, wherein processing the content data, with the clustering model, to remove the duplicate content from the content data comprises:

deriving features from the content data;

clustering the features into clusters;

deriving similarity matrices for the features in the clusters; and removing the duplicate content from the content data based on the similarity matrices.

8. A device, comprising:

one or more processors configured to:

receive user activity data identifying activities of a user;

receive content data identifying text transcripts associated with the user;

generate a first custom embedding associated with the user based on the user activity data;

process the content data, with a clustering model, to remove duplicate content from the content data;

process the first custom embedding, with a machine learning model, to generate an intent of the user and a next action for the user based on the intent;

process the content data to generate a second custom embedding for the user and an end user vector based on the second custom embedding;

generate a document vector for the user based on the next action for the user;

process the document vector and the end user vector, with a language model, to generate a document for the user; and perform one or more actions based on the document, wherein the one or more processors, to perform the one or more actions, are configured to one or more of:

provide the document for display to the user;

receive a request from the user based on the document;

perform an action requested by the user based on the document; or retrain the language model or the machine learning model based on the document.

9. The device of claim 8, wherein the machine learning model is a sequential multilayer perceptron model.

10. The device of claim 8, wherein the language model is a large language model.

11. The device of claim 8, wherein the document is a self-help document for the user.

12. The device of claim 8, wherein the user activity data includes data identifying one or more of historical call intents of the user, historical chat intents of the user, events associated with the user, transactions associated with the user, site catalyst data associated with the user, searches performed by the user, remarks provided by the user, or support tickets associated with the user.

13. The device of claim 8, wherein the content data includes data identifying one or more of a vocabulary of the user, emotions of the user, grammar of the user, demographics of the user, a language preference of the user, or product features associated with the user.

14. The device of claim 8, wherein the one or more processors are further configured to:

generate a modified document for the user based on the user requiring assistance with the document; and performing one or more actions based on the modified document.

15. A non-transitory computer-readable medium storing a set of instructions, the set of instructions comprising:

one or more instructions that, when executed by one or more processors of a device, cause the device to:

receive user activity data identifying activities of a user;

receive content data identifying text transcripts associated with the user;

generate a first custom embedding associated with the user based on the user activity data;

process the first custom embedding, with a machine learning model, to generate an intent of the user and a next action for the user based on the intent;

process the content data to generate a second custom embedding for the user and an end user vector based on the second custom embedding;

generate a document vector for the user based on the next action for the user;

process the document vector and the end user vector, with a language model, to generate a document for the user, wherein the document is a self-help document for the user;

receive a user action associated with the document;

determine whether the user required assistance with the document based on the user action associated with the document; and selectively:

store the document based on the user not requiring assistance with the document, or process the document, with the language model, to generate a modified document for the user based on the user requiring assistance with the document.

16. The non-transitory computer-readable medium of claim 15, wherein the one or more instructions further cause the device to one or more of:

provide the document or the modified document for display to the user;

provide the modified document for review by a content moderator;

determine whether the user required assistance with the modified document;

receive a request from the user based on the document or the modified document;

perform an action requested by the user based on the document or the modified document; or retrain the language model or the machine learning model based on the document or the modified document.

17. The non-transitory computer-readable medium of claim 15, wherein the one or more instructions further cause the device to:

process the content data, with a clustering model, to remove duplicate content from the content data.

18. The non-transitory computer-readable medium of claim 17, wherein the one or more instructions, that cause the device to process the content data, with the clustering model, to remove the duplicate content from the content data, cause the device to:

derive features from the content data;

cluster the features into clusters;

derive similarity matrices for the features in the clusters; and remove the duplicate content from the content data based on the similarity matrices.

19. The non-transitory computer-readable medium of claim 15, wherein the machine learning model is a sequential multilayer perceptron model and wherein the language model is a large language model.

20. The non-transitory computer-readable medium of claim 15, wherein the user activity data includes data identifying one or more of historical call intents of the user, historical chat intents of the user, events associated with the user, transactions associated with the user, site catalyst data associated with the user, searches performed by the user, remarks provided by the user, or support tickets associated with the user.

* * * * *